Patented June 30, 1953

2,643,986

UNITED STATES PATENT OFFICE 2,643,986

FIBER-FORMING POLYMERS RENDERED DYE-RECEPTIVE BY REACTION WITH TRIS(DIMETHYLAMIDO) PHOSPHITE

George E. Ham and Alfred B. Craig, Dayton, Ohio, assignors, by mesne assignments, to The Chemstrand Corporation, a corporation of Delaware No Drawing. Application January 26, 1951, Serial No. 208,087

20 Claims. (Cl. 260—45.5)

This invention relates to polymeric compositions having unusual fiber-forming properties. More specifically the invention relates to polymeric acrylonitrile compositions capable of being converted readily into dyeable general purpose fibers.

It is well-known that polyacrylonitrile, and various copolymers of acrylonitrile and other olefinic monomers, can be spun into synthetic fibers having unusual physical properties. Because polyacrylonitrile and the many copolymers of acrylonitrile are almost inert chemically, conventional dyeing procedures are not useful in processing them. Many copolymers of acrylonitrile have been prepared using as the comonomers substances which have dye affinity. Copolymers of this type are not always satisfactory because of the excessive cost of the dye-receptive comonomers and because the introduction of such substances often depreciates the desirable fiber-forming characteristics of the copolymer.

The primary purpose of this invention is to provide a new acrylonitrile polymer composition which has the chemical and physical properties of polyacrylonitrile, but which is also completely dye-receptive or can be made so by simple readily practicable procedures. A further purpose of this invention is to provide a means of converting non-dyeable acrylonitrile polymers into a dye-receptive form. A still further purpose is to provide new general purpose synthetic fibers.

In accordance with this invention it has been found that non-dyeable fiber-forming copolymers of over 80 per cent by weight of acrylonitrile and two to 20 per cent of an alkenyl β-chloroethyl ether may be rendered dye-receptive by reaction with tris(dimethylamido) phosphite. The invention is also applicable to the treatment of any polymers which contain a substantial quantity of the alkenyl β-chloroethyl ether, for example, from 20 to 100 per cent. Polymers of the latter type are not in themselves fiber-forming, but are quite useful in the preparation of fiber-forming polymers by blending a small proportion of the said polymers with a larger proportion of the fiber-forming acrylonitrile polymers. The blended polymers retain the desirable physical properties of the base polymer but also acquire the chemical properties of the blended polymer. Thus, the blended polymers are capable of reacting with tris(dimethylamido) phosphite whereby dye-receptive polymers are prepared. Alternatively the polymer of an alkenyl β-chloroethyl ether may be first reacted with tris(dimethylamido) phosphite and thereafter blended with suitable base polymer.

The alkenyl β-chloroethyl ethers suitable for the practice of this invention include vinyl β-chloroethyl ether, allyl β-chloroethyl ether, methallyl β-chloroethyl ether, and isopropenyl β-chloroethyl ether and the class of compounds may be represented by the following structural formula:

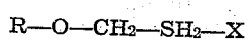

wherein R is an alkenyl radical selected from the group consisting of vinyl, allyl, methallyl and isopropenyl and X is a halogen atom.

The proportions of the polymers of alkenyl β-chloroethyl ethers will depend upon the degree of dye-receptivity desired and upon the proportion of the β-chloroethyl ether in the blending polymer. In general, it is desirable to have from two to 20 per cent of the fiber-forming composition in the polymeric form of the alkenyl β-chloroethyl ether. Thus, if the blending polymer is 100 per cent alkenyl β-chloroethyl ether polymers, from two to 20 per cent by weight will be required to develop suitable dye-receptivity. If a copolymer of the β-chloroethyl ether and another monomer is used, proportionately more will be required to obtain the desired end result. Copolymers of more than 20 per cent of the alkenyl β-chloroethyl ether and up to 80 per cent of another olefinic monomer may be used. These other monomers include acrylonitrile, methacrylonitrile, vinyl acetate, vinylidene chloride, styrene, α-methylstyrene and the various alkyl acrylates, methacrylates, fumarates, and maleates wherein the alkyl radical has up to four carbon atoms. Because the copolymers of acrylonitrile have unusual solvent and chemical resistance the preferred blending polymer is one of a substantial proportion of acrylonitrile and sufficient alkenyl β-chloroethyl ether to develop the necessary dye-receptivity in the proportions to be blended with the fiber-forming acrylonitrile polymers. A very useful polymer is one of 50 per cent of acrylonitrile and 50 per cent of vinyl β-chloroethyl ether.

In the preparation of the fiber-forming polymers which are capable of being converted into dye-receptive form by the practice of this invention there are included the copolymers of 80 per cent to 98 per cent of acrylonitrile and from two to 20 per cent of the alkenyl β-chloroethyl ether. If desired, minor proportions, for example, up to 18 per cent of one or more other monomers may be copolymerized with the critical components, for example, methacrylonitrile, styrene, vinyl acetate, α-methylstyrene, vinyl chloride, vinylidene chloride, the alkyl esters of maleic, fumaric acrylic and methacrylic acids, wherein the alkyl group has up to four carbon atoms.

The polymers of the unsaturated esters of alkenyl β-chloroethyl ether are preferably prepared in aqueous medium in the presence of a water-soluble peroxy catalyst and in the presence of an agent which maintains the polymer formed in a fine but granular dispersed condition. Suitable peroxy catalysts are the alkali metal persulfates and suitable dispersing agents are the alkali metal salts of sulfonated hydrocarbons. Polymerization may be conducted by batch procedures, by continuous procedures, or by combinations of these procedures. A preferred method of preparation involves a batch procedure wherein the desired monomers are mixed and charged gradually throughout the polymerization. Unusually uniform polymers may be obtained by also charging the catalyst and emulsifier continuously or in increments throughout the course of the reaction. More uniform polymerization conditions may be achieved by operating at uniform temperatures, for example, the reflux temperature of the medium, especially if the operation is so conducted as to provide a constant temperature at reflux.

If desired, the polymerization reaction may be conducted in the presence of a "redox" agent, for example, sulfur dioxide, sodium bisulfite, thiosulfate, or other sulfur compounds in which the sulfur is present in an oxidizable condition. Other optional procedures may involve the use of regulators which serve as chain terminators to prevent the formation of very high molecular weight increments, agents of this type being tertiarydodecyl mercaptan, thioglycolic acid, and thioglycidol.

In order to convert the alkenyl β-chloroethyl ether polymers or the fiber-forming blends containing increments of the alkenyl β-chloroethyl ether polymers, it is necessary to react the alkenyl β-chloroethyl ether group with tris(dimethylamido)phosphite. This reaction serves to quaternize the compound to convert it into a form which is reactive with acid dyestuffs. The polymers so treated are then capable of use in the fabrication of general purpose fibers.

The polymer may be treated with the tris(dimethylamido)phosphite by reaction with the polymer in the finely divided solid state, in solution in a suitable solvent or in the form of the finished fiber. If the polymer is in solid form, obviously only the surface will be reacted chemically, and if the polymer thus treated is subsequently dissolved and spun into fibers, the limited amount of effective component on the surface will be diluted when spun into fiber form. Accordingly, the preferred practice involves chemical treatment in solution state, where it is possible to approach stoichiometric reaction, or in the fiber form where saturation may be achieved on the surface.

It has been found that the most readily dyeable fibers are prepared by reaction with the tris(dimethylamido)phosphite dissolved in a suitable solvent, for example N,N-dimethylformamide, butyrolactone, ethylene carbonate, and other conventional polyacrylonitrile solvents. In the practice of this invention the solutions of the polymers are mixed with tris(dimethylamido)-phosphite by means of any conventional mechanical mixer, for example, Banbury mixer, roll mill or dough mixers. It is generally desirable to add sufficient tris(dimethylamido)phosphite to convert all of the alkenyl β-chloroethyl ether nuclei to the phosphonium group, although this does not necessarily have to occur. Obviously, if the extent of reaction is materially less than stoichiometric, it will be necessary to have a larger proportion of the alkenyl β-chloroethyl ether nuclei present than is required generally for effective dye acceptance. In general, if the reaction is sufficient to convert to phosphonium groups from two to ten per cent of the total monomer present in the copolymers or blended copolymers a satisfactory result will be achieved, and if only from two to ten per cent of the monomer is in the form of alkenyl β-chloroethyl ether monomer a substantially complete reaction will be desirable.

The new blended compositions may be fabricated into synthetic fibers by conventional wet or dry spinning procedures. After stretching the fibers to develop the necessary orientation and the incident tensile strength, and thereafter shrinking the fibers to improve their thermal resistance, valuable general purpose fibers are obtained.

Further details of this invention are set forth with respect to the following example:

*Example*

A copolymer of 94 parts by weight of acrylonitrile and six parts of vinyl β-chloroethyl ether was dissolved in N,N-dimethylacetamide at 80° C. to form an eighteen per cent solution. The solution was cooled to 60° C. and 2.79 per cent (by weight of the solution) of tris(dimethylamido)phosphite was added thereto. The mixture was allowed to remain at 60° C. for six hours. The solution was then extruded through a spinneret having 30 apertures each 0.0035 inch in diameter. The fiber so formed was stretched 150 per cent during the washing period, dried on steam heated rolls and then stretched 381 per cent in a steam atmosphere. The resulting fiber was found to have excellent receptivity in Wool Fast Scarlet G Supra dye when treated for one hour in a dyebath containing 0.02 gram of dye, 0.1 gram of sulfuric acid and 40 ml. of water per gram of fiber.

*Addendum*

In the first complete paragraph on column two (2) the invention is described with respect to the chlorine analogue, but other halogen analogues are also useful, particularly the bromine as in methallyl β-bromoethyl ether.

What is claimed is:

1. A method of preparing dye-receptive polymers which comprises reacting tris(dimethylamido)phosphite and a polymer of a monomeric substance of which at least two percent by weight of the total monomer content is a compound of the structure:

$$R-O-CH_2-CH_2-X$$

wherein R is an alkenyl radical selected from the group consisting of vinyl, allyl, methallyl, and isopropenyl and X is a halogen atom, and up to 98 percent of another polymerizable mono-olefinic monomer.

2. The method defined in claim 1 wherein the compound is an alkenyl beta-chloroethyl ether.

3. A method of preparing a dye-receptive copolymer which comprises reacting tris(dimethylamido) phosphite and a copolymer of 80 to 98 percent by weight of acrylonitrile and from two to 20 percent of a compound of the structure:

R—O—CH₂—CH₂—X wherein R is an alkenyl radical selected from the group consisting of vinyl, allyl, methallyl, and isopropenyl and X is a halogen atom.

4. The method defined in claim 3 wherein the compound is an alkenyl beta-chloroethyl ether.

5. A method of preparing a dye-receptive polymer which comprises reacting tris (dimethylamido) phosphite with a blend of a polymer of a monomeric substance of which acrylonitrile is at least 80 percent of the total monomeric content and a polymer of a monomeric substance of which at least 20 percent is a compound of the structure:

R—O—CH₂—CH₂—X wherein R is an alkenyl radical selected from the group consisting of vinyl, allyl, methallyl, and isopropenyl and X is a halogen atom, and up to 80 percent of another polymerizable mono-olefinic monomer.

6. The method as defined in claim 5 wherein the compound is an alkenyl beta-chloroethyl ether.

7. A method of preparing a dye-receptive polymer which comprises reacting tris (dimethylamido) phosphite with a copolymer of polymerizable monomeric substances of which at least 20 percent of the total monomer content is a compound of the structure:

R—O—CH₂—CH₂—X wherein R is an alkenyl radical selected from the group consisting of vinyl, allyl, methallyl, and isopropenyl and X is a halogen atom, and up to 80 percent of another polymerizable mono-olefinic monomer, and thereafter blending the reacted copolymer with a polymer of a polymerizable monomeric substance of which at least 80 percent by weight of the total polymerizable monomer is acrylonitrile.

8. The method as defined in claim 7 wherein the compound is an alkenyl beta-chloroethyl ether.

9. A dye-receptive polymer which comprises a polymer of a polymerizable monomeric substance of which at least two percent of the total monomer is a compound of the structure:

R—O—CH₂—CH₂—X wherein R is an alkenyl radical selected from the group consisting of vinyl, allyl, methallyl, and isopropenyl and X is a halogen atom, and up to 98 percent of another polymerizable mono-olefinic monomer, said polymer having been reacted with tris (dimethylamido) phosphite.

10. The dye-receptive polymer defined in claim 9 wherein the compound is an alkenyl beta-chloroethyl ether.

11. The polymer defined in claim 9 wherein the compound is vinyl beta-chloroethyl ether.

12. The polymer defined in claim 9 wherein the compound is allyl beta-chloroethyl ether.

13. The polymer defined in claim 9 wherein the compound is methallyl beta-chloroethyl ether.

14. The polymer defined in claim 9 wherein the compound is isopropenyl beta-chloroethyl ether.

15. A dye-receptive polymer which comprises a copolymer of 80 to 98 percent by weight of acrylonitrile and from 2 to 20 percent by weight of a compound of the structure:

R—O—CH₂—CH₂—X wherein R is an alkenyl radical selected from the group consisting of vinyl, allyl, methallyl, and isopropenyl, and X is a halogen atom, said copolymer having been reacted with tris (dimethylamido) phosphite.

16. The dye-receptive polymer defined in claim 15 wherein the compound is an alkenyl beta-chloroethyl ether.

17. The polymer defined in claim 15 wherein the compound is vinyl beta-chloroethyl ether.

18. The polymer defined in claim 15 wherein the compound is allyl beta-chloroethyl ether.

19. The polymer defined in claim 15 wherein the compound is methallyl beta-chloroethyl ether.

20. The polymer defined in claim 15 wherein the compound is isopropenyl beta-chloroethyl ether.

GEORGE E. HAM.
ALFRED B. CRAIG.

References Cited in the file of this patent

UNITED STATES PATENTS

| Number | Name | Date |
|---|---|---|
| 2,503,245 | Coover et al. | Apr. 11, 1950 |